United States Patent [19]
Eddleman et al.

[11] 3,766,360
[45] Oct. 16, 1973

[54] LABORATORY HOT PLATE

[75] Inventors: Roy T. Eddleman, Beverly Hills; Richard L. Schmitz, Palos Verdes Penninsula, both of Calif.

[73] Assignee: Biospectrum, Incorporated, Los Angeles, Calif.

[22] Filed: Aug. 7, 1972

[21] Appl. No.: 278,527

[52] U.S. Cl. .................. 219/415, 99/348, 219/347, 219/354, 219/432, 219/433, 219/461, 219/521, 259/102
[51] Int. Cl. ........................................... F27d 11/02
[58] Field of Search .................. 219/347, 353, 354, 219/355, 415, 417, 432, 433, 438, 439, 441, 442, 461, 521; 259/102; 99/348, 444, 445, 446

[56] References Cited
UNITED STATES PATENTS

| | | | |
|---|---|---|---|
| 3,415,978 | 12/1968 | Hanson | 219/415 |
| 2,425,271 | 8/1947 | Tandler | 219/415 X |
| 3,445,662 | 5/1969 | Langley | 219/354 X |
| 3,052,791 | 9/1962 | Jacobs et al. | 219/435 |
| 1,825,406 | 9/1931 | Lipham | 219/417 X |
| 2,031,019 | 2/1936 | Walker et al. | 219/433 X |
| 2,797,298 | 6/1957 | Fujitani | 226/172 |
| 3,089,940 | 5/1963 | Norton | 219/354 X |
| 3,240,915 | 3/1966 | Carter et al. | 219/354 X |
| 3,527,154 | 9/1970 | Shaper et al. | 99/446 X |
| 3,553,427 | 1/1971 | Filipak | 219/463 |

Primary Examiner—Volodymyr Y. Mayewsky
Attorney—Edgar W. Averill, Jr.

[57] ABSTRACT

A laboratory hot plate useful for heating liquids including a container platform, a curved reflecting surface extending upwardly from the platform, a viewing and spillway trough passing through the reflecting surface and a heating element located inwardly from said reflecting surface whereby the heat emitted from said element is reflected inwardly toward the container platform. The hot plate has the ability to heat liquids at a very fast rate and may be combined with a magnetic stirrer. The trough permits viewing the contents of a transparent container and also provides a spillway in case of container breakage.

10 Claims, 5 Drawing Figures

PATENTED OCT 16 1973 3,766,360

LABORATORY HOT PLATE

CROSS REFERENCES TO RELATED APPLICATIONS

A design patent application on the ornamental features of the present heater was filed about Nov. 29, 1971 Pat. No. & Lyon Docket No. 135/248) by the present inventors.

BACKGROUND OF THE INVENTION

The field of the invention is hot plates useful for heating liquids held in containers. More particularly, the invention relates to a laboratory hot plate especially useful for the rapid heating of liquids held in glass containers having a cylindrical lower portion. Containers such as glass beakers are commonly used in chemical laboratories and the heater of the present invention is particularly useful for heating the contents of such containers. Another type of container particularly useful with the present invention is disclosed in a United States patent application filed by Roy T. Eddleman on Apr. 29, 1971 Ser. No. 138,617.

DESCRIPTION OF THE PRIOR ART

Most commonly used laboratory hot plates comprise devices which utilize a spirally wound heating element which either directly forms a container base or is separated from the container by a heat transmissive support surface. Such heaters although generally satisfactory have several important disadvantages. First, a great deal of heat, rather than being passed into the container, is radiated from the surface into the surrounding laboratory. This not only can cause operator discomfort but also reduces the heating rate of the liquid in the container. Laboratory heaters are often supplied with a magnetic stirrer which cooperates with a magnetic member placed within the container. As the magnetic stirrer below the heating surface is turned the magnetic member within the container also turns.

Infrared heating is commonly used for cooking purposes and infrared lamps have also been used in conjunction with stoves. Pat. No. 3,415,978 discloses an infrared surface cooking unit wherein the container is placed in a cooking well and surrounded by an annular nickel-chromium or iron-chromium heating element. Such a unit would be inappropriate for laboratory use in that it is desirable and often essential that the contents of a container being heated be viewed in order to observe the progress of a chemical reaction or other change. Furthermore, severe problems would be created by container breakage within the container well of the cooking unit since the spilled contents would be trapped in the well.

SUMMARY OF THE INVENTION

The present invention is for a laboratory hot plate for the rapid heating of liquids which heater comprises a generally horizontal container platform having a curved reflecting surface located above. The reflecting surface has a viewing and spillway trough passed therethrough and the lower surface of the trough is at least as low as the surface of the platform to permit drainage of any fluids spilled upon the platform. A heating element is located near the surface of the curved reflecting surface so that the heat radiated by the heating element is reflected inwardly toward the platform thereby focusing or directing the heat toward a container placed upon the platform. Preferably the container used with the hot plate is transparent. The diameter of the platform and of the upper opening in the curved surface are preferably about equal and the container, which holds the liquid to be heated, is cylindrical and only slightly smaller than this diameter. In this way, a maximum percentage of heat passes into the container and a minimum percentage is reflected away from the hot plate. Thus, the hot plate of the present invention is particularly adapted for laboratory use where cylindrical glass containers of a predetermined diameter are commonly used.

DESCRIPTION OF THE PREFERRED EMBODIMENTS

Figure 1:
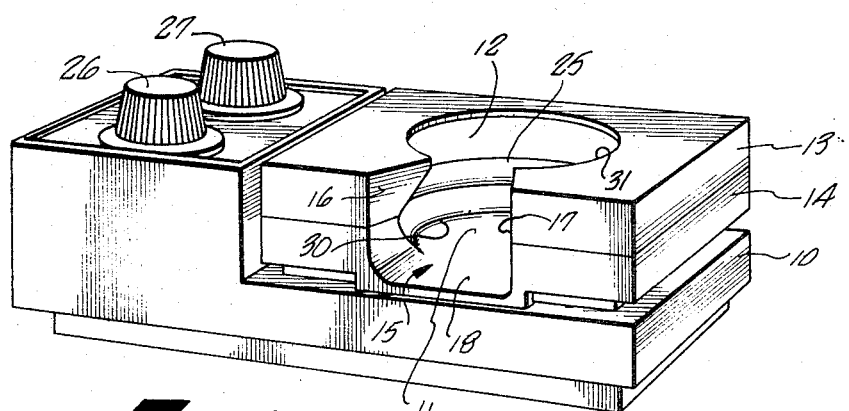
FIG. 1 is a perspective view of the laboratory hot plate of the present invention.

Turning now to FIG. 1 there is shown a laboratory hot plate having a base 10 upon which a container platform 11 is supported. A curved reflecting surface 12 rises from the surface of the container platform 11. The reflecting surface 12 is located in a reflector block which has an upper half 13 and a lower half 14. The block is preferably made from a light weight metal such as aluminum and may be either solid or hollowed out to reduce weight and cost.

A viewing and spillway trough 15 is located in one side of the hot plate. Trough 15 has 2 vertical sides 16 and 17 which lie in two planes which intersect the vertical axis of the container platform 11. The lower surface 18 of trough 15 is at the same level as container platform 11 although it might also be curved downwardly with respect to platform 11 in order to further increase its ability to drain any spilled fluids. A heating element 25 is located near the surface of curved reflecting surface 12. A heater control knob 26 and a stirrer control knob 27 are attached to the base and the details of the stirrer control are described in more detail below. The heater control may be a conventional thermostatic control unit which operates to control heating element 25 or can comprise a proportional controller whereby a relatively large wattage input is fed to the element 25 when the temperature at the platform is low.

Figure 2:
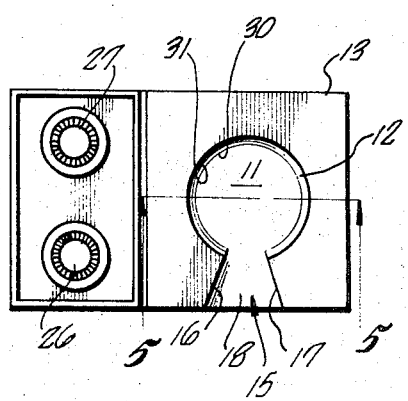
FIG. 2 is a plan view of the hot plate of FIG. 1.

The hot plate of FIG. 1 is shown in plan view in FIG. 2. The edge of container platform 11 forms a circle 30 which is the intersection of the container platform 11 and reflecting surface 12. The upper edge 31 of reflecting surface 12 also forms a circle and this latter circle is about the same size, although slightly larger, than the container platform 11. In this way, a cylindrical beaker having a diameter slightly smaller than the circle 31 may be placed in the hot plate and a minimum amount of heat will be radiated or conducted by air currents away from the container.

Sides 16 and 17 of trough 15 lie along a plane which intersects the vertical axis of container platform 11. Although this configuration is preferable in that it permits viewing the container contents from a relatively wide angle, other configurations may also be used. For instance, sides 16 and 17 could be parallel to one another and to the radius of platform 11 which intersects them. Furthermore, the sides need not be vertical but instead may be at an angle apart from vertical. Still further, the sides need not be straight or planar and can instead be curved. An important feature of the present invention relates to the angular opening at the point of intersection between the sides 16 and 17 with the edge 30 of platform 11. This angle should be small in order to maximize the amount of reflecting surface so that the heating rate of the laboratory hot plate can be maximized. It has been found that this angle should be less than about 90° and preferably about 40°. This angle of opening should not be so small that it interferes with the ability to view container contents and to provide ready egress of spills. It has been found that this angle should be at least 10 degrees in order to perform these functions satisfactorily.

Figure 3:
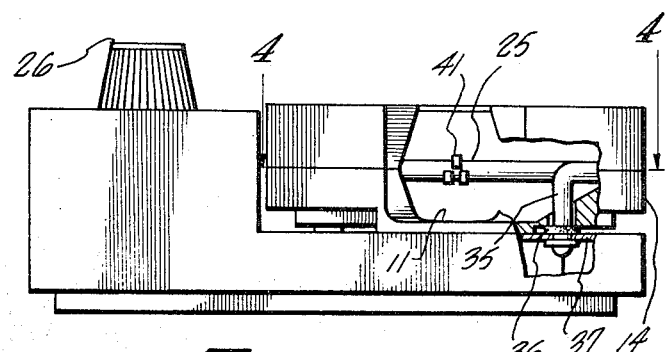
FIG. 3 is a front view, partially broken away, of the hot plate of FIG. 1.
Figure 4:
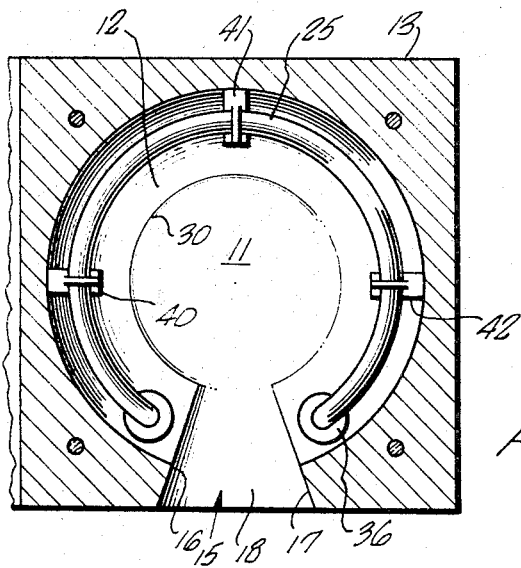
FIG. 4 is a cross-sectional view taken along the line 4—4 of FIG. 3.

One method of supporting heating element 25 at a position near the surface of reflecting surface 12 is shown in FIGS. 3 and 4. Heating element 25 is bent downwardly and has two vertically directed legs, one of which is shown in FIG. 3 by reference character 35. Leg 35 passes through an insulative grommet 36 which is supported in an upper member 37 of base 10. As shown in FIG. 4, element 25 is held in position by three clips 40, 41 and 42. Clips 40, 41 and 42 are held in three openings formed at the intersection of the upper half 13 and the lower half 14 of the reflector block. In this way, the heating element may be readily removed and replaced in case it burns out. Such removal would be carried out by separating upper half 13 from lower 14 and lifting the heating element from the base after disconnecting the conventional electrical connections within the base, not shown.

Figure 5:
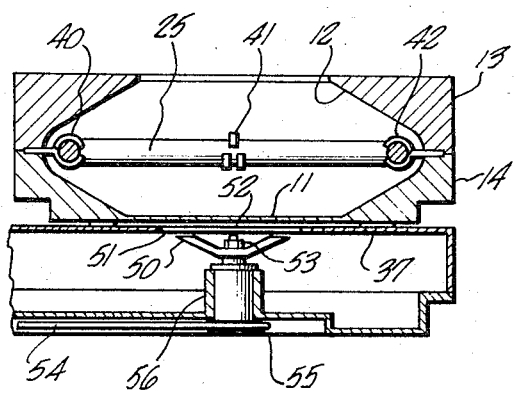
FIG. 5 is a cross-sectional view taken along the line 5—5 of FIG. 2.

Turning now to FIG. 5, the connection of the three clips 40, 41 and 42 between the upper and lower halfs 13 and 14 of the reflector blocks is more clearly shown. Also, the position of the heating element 25 with respect to reflecting surface 12 is shown. Reflecting surface 12 should be shaped to reflect the rays emitted from element 25 in a direction toward the center of the container platform 11. For instance, if surface 12 is in a shape of a parabola which has been rotated about the vertical axis of platform 11 then the center of the heating element should be located at the focal point of the parabola. Since it is not essential that the rays be reflected exactly in a parallel direction, the surface 12 need not be parabolic but instead can be semi-circular, semi-elliptical or the like. A simple but effective shape combines a semi-circle with two straight-line tangents. The location of the heating element should be such that rays are reflected generally parallel or slightly downward in order to minimize heat loss.

The hot plate of the present invention has a further substantial advantage over commonly used hot plates which have their heating elements below the container platform. That advantage relates to the combination of the hot plate with magnetic stirring means. As shown in FIG. 5, a rotatable magnet 50 is located in an opening 51 in member 37. This permits magnet 50 to be located near the lower surface of container platform 11. Magnet 50 is held on shaft 52 by nut 53. Shaft 52 is held in bearing 56 and is rotated by the movement of belt 54 in pulley 55 which is connected to shaft 52. By the location of heating element 25 above container platform 11 and the magnetic stirring means below the surface of platform 11 the protection from overheating of the magnetic stirring means is greatly improved. Prior art laboratory heaters required that the heating element and the magnetic stirrer both be located below container platform 11 which created the neccessity to insulate the magnetic stirring means from over heating. Since high temperature reduces the ability of a magnet to maintain its permanent magnetism, the ability to operate the magnet at a lower temperature is an important advantage. It is preferable that magnet 50 be fabricated from a material which is capable of maintaining a high magnetic field even at relatively high temperatures. It has been found that aluminum, nickel, cobalt alloys are particularly effective for this purpose. Belt 54 is moved by a second pulley and a motor of conventional design not shown. The motor is preferably a variable speed motor and is controlled through stirrer control 27.

Curved reflecting surface 12 is preferably coated with a corrosion resistant and highly reflective material. This coating is not essential if the reflecting block itself possesses these characteristics. When the reflecting block is made from aluminum, the reflecting surface need not be coated but a further improvement in operating efficiency and long life is obtained if the aluminum is coated with a metal such as rhodium or gold.

The ability of the hot plate of the present invention to rapidly heat container contents is remarkable. A hot plate fabricated in a manner similar to that shown in the drawings and utilizing a 480 watt nickel-chromium heating element was compared with a conventional laboratory hot plate utilizing a 600 watt nickel-chromium element. 250 milliliters of water in a 300 milliliter glass container having a cylindrical bottom was placed on the container surface of each hot plate. The time to heat the water from 21° C to the boiling point was measured. Both devices were provided with magnetic stirring means. The conventional hot plate required 14¾ minutes to bring the water to boil, whereas the hot plate made according to the present invention required only 7¼ minutes. The difference is even more dramatic with larger amounts of water. The same two hot plates were compared using 475 milliliters of water at 21° C. The conventional hot plate-stirrer required 23¾ minutes to boil and the hot plate-stirrer made according to the present invention required only 12¼ minutes to boil.

The hot plate of the present invention used for the above boiling time comparison had a container platform having a diameter of 2.70 inches and a reflecting surface having a maximum diameter of 4.375 inches and a upper diameter of 2.90 inches. The reflecting surface was made by the rotation of a circle having a diameter 0.375 inches having its center rotated 1 13/16 inches from the vertical axis of the container platform. The remainder of the curved surface was formed by the rotation of two straight line tangents to the rotated circle one intersecting the container platform at its edge and the other intersecting the upper opening. Thus, the term "conclave curve" as used herein is intended to include those shapes which include a straight portion. As stated above, since it is not necessary to accurately focus the reflected rays in a parallel manner, the shape of the reflecting surface is not as critical for the present invention as it would be for a reflecting mirror for optical purposes. Thus, the above-described combination of a circle with two straight lines which approaches a parabola is satisfactory for use with the present invention.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

We claim:

1. A laboratory hot plate useful for heating liquids held in a container comprising:
   a base;
   a generally horizontal container platform supported by said base;
   a curved reflecting surface extending upwardly from said platform, said surface being in the shape of an inwardly facing concave curve rotated about the vertical axis of said platform;
   a viewing and spillway trough having an opening of at least 10° passing through said reflecting surface and having its lower surface at least as low as the surface of said platform;
   a longitudinal, curved, radiant electrical heating element mounted in the opening formed by said curved reflecting surface and near the surface thereof, whereby the radiant heat, emitted by said element is reflected inwardly by said surface; and
   electrical connection means attached to said heating element and supplying electrical current to said heating element for heating thereof.

2. The hot plate of claim 1 wherein said concave curve is partially semi-circular and has two straight line tangents.

3. The hot plate of claim 1 wherein said concave curve is a parabola.

4. The hot plate of claim 1 wherein the sides of said trough are planar and lie along two planes which intersect at the vertical axis of said platform and are spaced apart less than about 90° and more than about 10°.

5. The hot plate of claim 4 wherein said sides are spaced apart about 40°.

6. The hot plate of claim 1 wherein said reflecting surface is plated with a corrosion resistant, highly reflective material.

7. The hot plate of claim 1 further including magnetic stirrer means located below said platform and attached to said base.

8. A fast heating laboratory hot plate useful for heating a liquid held in a container having a cylindrically shaped lower portion comprising:
   a base;
   a generally horizontal circular container platform supported by said base;
   a curved reflecting surface extending upwardly from said platform, said surface being in the shape of an inwardly facing concave curve rotated about the vertical axis of said platform;
   a viewing and spillway trough having an opening of at least 10° passing through said reflecting surface and having its lower surface at least as low as the surface of said platform, said trough having generally vertical sides which are spaced from each other about 40° at the intersection of said platform and said reflecting surface;
   a longitudinal semi-circular electrical heating element mounted in the opening formed by said curved reflecting surface and near the surface thereof, whereby the radiant heat emitted by said element is reflected inwardly by said surface; and
   electrical connection means attached to said heating element and supplying electrical current to said heating element for heating thereof.

9. The hot plate of claim 8 wherein the diameter of said circular platform and the upper opening of said reflecting surface are about equal.

10. The hot plate of claim 9 wherein said diameter is about 2.8 inches and the electrical heating element has a rating of about 500 watts.

* * * * *